JAMES P. ELLIOTT.
Improvement in Stove-Pipe Shelves.
No. 114,279.      Patented May 2, 1871.
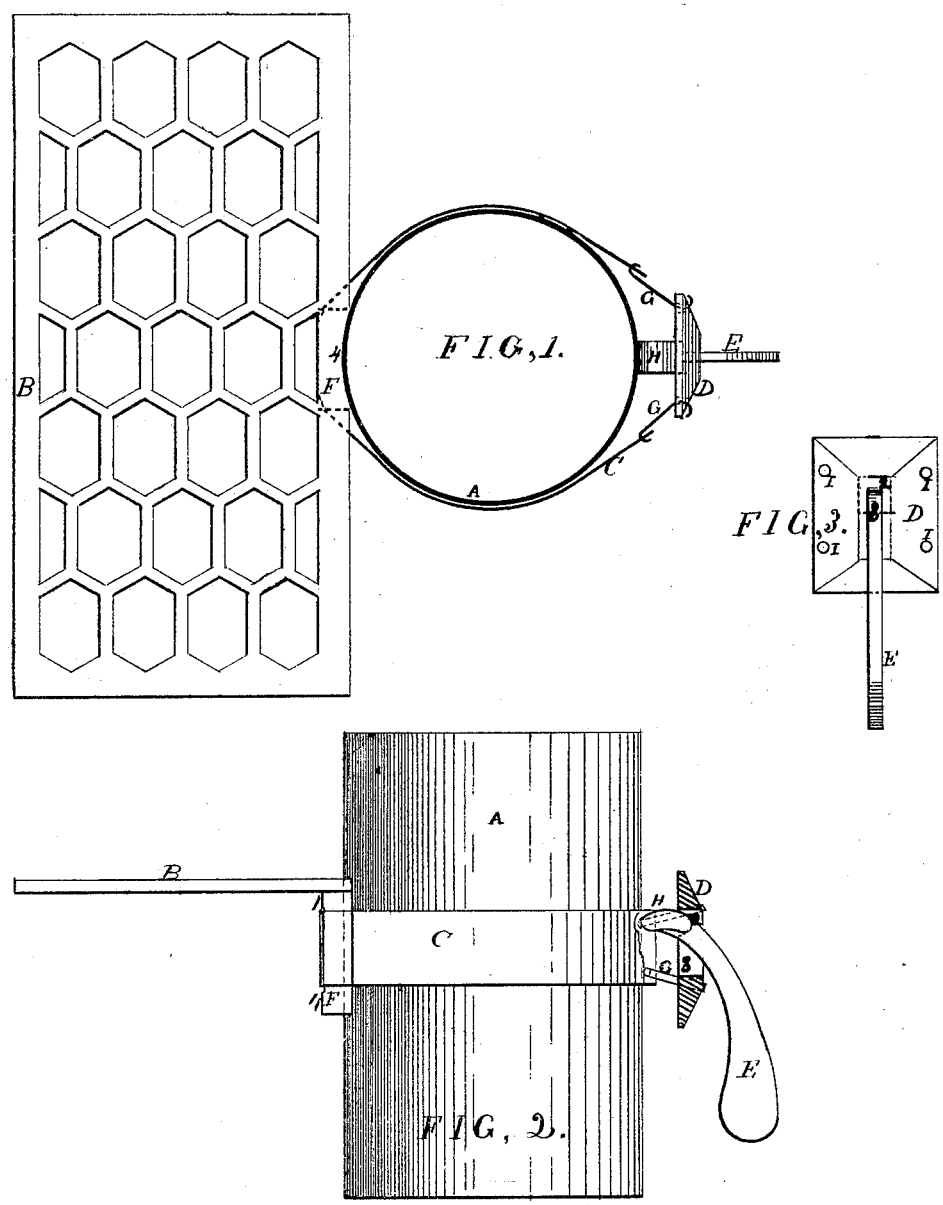

United States Patent Office.

JAMES P. ELLIOTT, OF BRIDGEPORT, CONNECTICUT.

Letters Patent No. 114,279, dated May 2, 1871.

---

IMPROVEMENT IN STOVE-PIPE SHELVES.

---

The Schedule referred to in these Letters Patent and making part of the same.

---

I, JAMES P. ELLIOTT, of Bridgeport, county of Fairfield, State of Connecticut, have invented a new and useful Improvement in "Adjustable Shelves" for Stove-Pipes, of which the following is a specification.

My invention relates to the use of an elastic metal band encircling the stove-pipe, confining to the pipe a shank connected with a drying-shelf, said band being secured to a plate by metal hooks and operated by a cam-lever.

The object of my invention is to support one or more shelves by the stove-pipe, for warming or drying purposes, in such a manner that they can be easily raised, lowered, or turned on the pipe at will.

Description of Accompanying Drawing.

Figure 1 is an end view of device.
Figure 2 is a side view of device.
Figure 3 is a back view of cam, plate, and lever.

General Description.

A, figs. 1 and 2, stove-pipe.
B, shelf.
C, band.
D, cam-plate.
E, lever.
F, shank for supporting shelf.
G G, connecting-hooks.
H, cam.
I I I I, holes for hooks.

Construction.

To the shelf B I attach the shank F, its outer face concave to fit the pipe. On its inner face I file the corners for a short distance toward the center, leaving the shoulders 1 1.

To secure the shelf to pipe I use an elastic metal band, C, encircling the pipe A and shank F, the ends having holes made to receive the hooks G, by which connection is made with the plate D by means of the holes I I I I. This confines the band and furnishes a hole for the lever E, on which the cam H is cast. The fulcrum for this lever is made by forming a half-circle recess, 2 2, in plate each side of opening 3.

The construction of the lever is such that, when the band is drawn tight around the pipe by action of cam H, its position will be nearly parallel with the pipe.

To form the cam H I re-enforce the sides of lever E and form the heel to correspond with the recesses 2 2, in which it works.

The manner of operation is easily understood. The band C is disconnected from the plate D, passed around the pipe, and again connected with plate D, the lever E having been previously put in position with cam as near parallel with plate as possible. The shank is then put between the pipe A and band C. The lever E is thrown down, forcing the cam H against the pipe A, which carries the plate away from pipe, thus drawing the band C tight around the shank F and pipe A, which holds the shelf B firmly in any desired position.

The advantages of my invention are readily seen.

First, simplicity of construction and facility with which it can be applied to any size of pipe. All the fitting required is to cut the band of proper length.

Second, the ease with which it can be raised, lowered, or turned on the pipe, or removed altogether.

Third, the shelf can be used either side up, as the shoulders 1 1 will prevent it falling out if set with shank upward.

I do not claim as new the shelf or the attaching of a shank to the same, neither the use of a band. I only claim as novel the construction of the shank F, plate D, cam H, lever E, and the means by which it is secured to the band C. I am not restricted to the concave form of face of shank E; I can give it any form desired so that I leave the outside edges to bear against the pipe.

Claim.

What I claim as my invention, and desire to secure by Letters Patent, is—

The combination, with pipe A, of band C, shank F, shoulders 1 1, shelf B, hooks G G, plate D with opening 3 and recesses 2 2, lever E re-enforced to provide for cam H, constructed and operated substantially as set forth.

In testimony whereof I have signed my name to this specification before two subscribing witnesses.

JAMES P. ELLIOTT.

Witnesses:
LAURA A. HUBBELL,
A. SKAATS.